United States Patent [19]

Merritt et al.

[11] 4,390,369

[45] Jun. 28, 1983

[54] NATURAL WAX-CONTAINING INK JET INKS

[75] Inventors: Alfred R. Merritt; Theodore M. Cooke, both of Danbury; An-Chung R. Lin, New Town; Richard G. Whitfield, Brookfield, all of Conn.

[73] Assignee: Exxon Research and Engineering Co., Florham Park, N.J.

[21] Appl. No.: 331,604

[22] Filed: Dec. 17, 1981

[51] Int. Cl.$^3$ ............................................. C09D 11/12
[52] U.S. Cl. .......................................... 106/31; 106/20
[58] Field of Search ................................... 106/20, 31; 260/DIG. 38

[56] References Cited

U.S. PATENT DOCUMENTS 3,653,932 4/1972 Berry et al. ............................ 106/22
3,715,219 2/1973 Kurz et al. ............................. 106/22

FOREIGN PATENT DOCUMENTS 56-55468   5/1981  Japan .
56-129274  9/1981  Japan .
56-166274 12/1981  Japan .
57-23665   6/1982  Japan .

*Primary Examiner*—John Kight, III
*Assistant Examiner*—Amelia B. Yarbrough
*Attorney, Agent, or Firm*—Robert S. Salzman

[57] ABSTRACT

A natural wax-containing ink jet ink for use in an ink jet apparatus which features good print quality. The ink jet ink is discharged from the ink jet ink apparatus at elevated temperatures above ambient.

19 Claims, No Drawings

NATURAL WAX-CONTAINING INK JET INKS

FIELD OF THE INVENTION

This invention relates to improved ink jet inks, and more particularly to ink jet inks that contain at least one natural wax.

BACKGROUND OF THE INVENTION

Ink jet inks many times provide marginal print quality. This is so, because water-based ink jet inks are generally incompatible with paper, having poor penetration and drying characteristics with respect to the paper.

On the other hand, oil-based inks which are more compatible with paper, have low surface tension and usually provide ink dots which are too large to give good print quality.

The present invention seeks to formulate ink jet inks which can provide small, circular dots on many paper media. These small circular dots will produce characters having good edge definition, and contrast, and hence, characters of good print quality.

The present invention proposes to use waxes as additives to ink fluids or which themselves serve as base fluid components of ink jet inks. The waxes of this invention are preferably natural waxes, or combinations thereof.

Wax-containing ink jet inks are usually solids or semi-solids at ambient temperature, and therefore, require to be discharged from an ink jet apparatus at elevated temperatures. The heated ink fluid will solidify when it comes in contact with its paper target. The rate of solidification of the wax-containing ink will control the degree of penetration into the paper, usually a small circular dot will result. As a general rule, inks containing wax as a major component thereof, will have less penetration into the paper than inks containing additive amounts of wax.

A definition of "waxes" can be found in Industrial Waxes by H. Bennett; Volumes 1 and 2; Chemical Publishing Company, Inc., New York, NY (1975). Bennett defines a wax as "an unctuous solid with varying degrees of gloss, slipperiness and plasticity, which melts readily".

Natural waxes may be of vegetable, animal, or mineral origin. Modified waxes are natural waxes that have been treated chemically to change their nature and properties. Synthetic waxes are made by the reaction or polymerization of chemicals. Compounded waxes are mixtures of various waxes or of waxes with resins or other compounds added thereto.

Natural waxes show variations in properties which may be due to soil, climate, age, oxidation, or impurities. Thus, small differences in properties exist for a particular wax. For most industrial uses, these small differences are not critical.

There is considerable misunderstanding as to the nature and classification of fats, waxes, gums, and resins. For example cocoa butter, although it is actually a fat, is commonly considered as a wax because of certain characteristic properties. On the other hand, wool wax, derived from lanolin, is technically a wax but, because of its properties, it is usually considered as a fat. Kauri gum is commonly called a wax; and so on.

The definition of "natural wax" for purposes of this invention is defined as: A wax or mixture of waxes of natural origin which can be either vegetable, animal or mineral, or which can be a chemically modified derivative thereof, or at least one wax of natural origin in combination with other types of wax or ink ingredients.

DISCUSSION OF RELATED ART

A hot melt ink for use in an ink jet apparatus is taught in U.S. Pat. Nos. 3,653,932 and 3,715,219, respectively.

The major component of the hot melt ink is a didodecyl-sebacate which is a highly viscous, electrically conductive, synthetic substance.

As compared with the present invention, the didodecyl-sebacate is a synthetic substance which is generally too viscous to provide good jetability in an impulse ink jet apparatus.

In addition, this synthetic hot melt substance does not have the characteristics of natural wax as defined above.

BRIEF SUMMARY OF THE INVENTION

The invention pertains to an ink jet ink composition comprising at least one natural wax. The wax-containing composition is discharged from an ink jet apparatus at an elevated temperature above ambient. The waxes of this invention are preferrably those waxes defined as "natural waxes". In this class are found waxes such as: Japan wax, candelilla wax, carnauba wax, etc.

The ink composition can contain waxes in an approximate range from 0.5 to 97.0 percentage by weight. The wax may be the basic fluid vehicle of the ink or may be used as an additive to other fluidic vehicles such as fatty acids, and more particularly oleic acid, and oleic acid with benzyl ether, etc.

Within the definition of the natural wax of this invention are also included compounded waxes which may include synthetic substances.

A coloring agent or dye such as an oil or solvent soluble dye is usually added to the composition for visibility.

It is an object of this invention to provide improved ink formulations for use in ink jet apparatuses;

It is another object of the invention to provide a natural wax-containing ink for an ink jet, which ink can give a small dot of good circularity;

It is a further object of this invention to provide a natural wax-containing ink for use in an ink jet, particularly an impulse ink jet, which ink will provide dots of good print quality.

These and other objects of this invention will become more apparent and will be better understood with respect to the following detailed description.

DETAILED DESCRIPTION OF THE INVENTION

Generally speaking, the invention is for an ink composition containing a natural wax, which composition is to be discharged from an ink jet apparatus at elevated temperatures above ambient.

Inks of this type have been found to provide highly repetitive dots of small size and extremely good print quality. Print quality is generally a measure of the circularity of the dot. The present inventive natural waxes provide circularities of 0.7 or better as measured by the technique described in U.S. application Ser. No. 248,551; filed Mar. 27, 1981; now Patent No. 4,361,843; which technique is meant to be incorporated herein by way of reference.

The ink formulations of this invention find particular applicability in impulse ink jet apparatuses, but not limited thereto.

Specific ink formulations which have been found to provide good ink dot circularity are presented in Table I below:

TABLE I

|  | 1 | 2 | 3 | 4 | 5 | 6 |
|---|---|---|---|---|---|---|
| Oleic Acid | 15.8 |  |  | 67.5 | 60.0 | 26.0 |
| Benzyl Ether | 60.0 |  |  |  |  | 60.5 |
| Typophor Black | 24.0 |  |  | 22.5 | 20.0 |  |
| Calco Chinoline Yellow | 0.2 |  |  |  |  |  |
| Candelilla Wax | 20.5 |  |  | 10.0 | 20.0 | 0.5 |
| Japan Wax |  | 97 | 95 |  |  |  |
| HD Victoria Blue |  |  |  |  |  | 0.5 |
| Calco Nigrosine Base |  |  |  |  |  | 13.0 |
| Acetosol Yellow RLSN |  |  |  |  |  | 2.5 |
| Oil Black BN |  | 3 | 5 |  |  |  |
| Viscosity | 6.7 (165° F.) | 11.8 (165° F.) 18.9 (57° C.) 16.3 (65° C.) 12.3 (74° C.) | 12.3 (165° F.) | 13.4 (165° F.) | 15.7 (165° F.) |  |

The above ink formulations provide dots which produce characters approaching and surpassing typewriter quality printing. As such, the above formulations are believed to provide inks which result in the finest print quality in the ink jet art.

The above formulations are, however, meant to be only exemplary, and are meant to provide a general teaching and understanding of the invention.

What is meant to be protected by way of Letters Patent is presented by the following appended claims.

What is claimed is:

1. A non-aqueous, phase change ink jet ink composition consisting essentially of at least one natural wax, said wax-containing composition to be discharged in a liquid phase at an elevated temperature above ambient from an ink jet apparatus and which solidifies to a solid phase upon impact with a target.

2. The ink jet ink composition of claim 1, wherein said natural wax is contained in an approximate weight percentage range from 0.5 to 97.0.

3. The ink jet ink composition of claim 1, further comprising oleic acid.

4. The ink jet ink composition of claim 1, comprising a mixture of natural waxes.

5. The ink jet ink composition of claim 1, comprises a natural wax in combination with a synthetic wax.

6. The ink jet ink composition of claim 1, wherein said natural wax-containing composition comprises a chemically modified or compounded wax.

7. The ink jet ink composition of claim 1, wherein said natural wax is selected from a group of waxes consisting of: Japan wax, candelilla wax, and carnauba wax.

8. The ink jet ink composition of claim 1, further comprising benzyl ether.

9. The ink jet ink composition of claim 1, further comprising at least one dye or coloring agent.

10. A non-aqueous, phase-change ink jet ink composition for use in an impulse ink jet apparatus consisting essentially of at least one natural wax, said wax-containing composition to be discharged from said impulse ink jet apparatus at an elevated temperature above ambient and which solidifies to a solid phase upon impact with a target.

11. The ink composition of claim 10, wherein said natural wax is contained in an approximate weight percentage range from 0.5 to 97.0.

12. The ink jet ink composition of claim 10, further comprising oleic acid.

13. The ink jet ink composition of claim 10, comprising a mixture of natural waxes.

14. The ink jet ink composition of claim 10, comprises a natural wax in combination with a synthetic wax.

15. The ink jet ink composition of claim 10, wherein said natural wax-containing composition comprises a chemically modified or compounded wax.

16. The ink jet ink composition of claim 10, wherein said natural wax is selected from a group of waxes consisting of: Japan wax, candelilla wax and canauba wax.

17. The ink jet ink composition of claim 10, further comprising benzyl ether.

18. The ink jet ink composition of claim 10, further comprising at least one dye or coloring agent.

19. A non-aqueous, phase-change ink jet ink composition consisting essentially of at least one wax, said composition having a maximum viscosity of 35 centipoise at a temperature in an approximate range of 125° to 180° F.

* * * * *